US009525498B2

(12) United States Patent
Kruger et al.

(10) Patent No.: US 9,525,498 B2
(45) Date of Patent: Dec. 20, 2016

(54) ARRANGEMENT FOR MONITORING THE OPERATION OF A TRANSMITTER ANTENNA SYSTEM, METHOD FOR MONITORING, AND A DETECTION ARRANGEMENT THAT CAN BE USED IN THE ARRANGEMENT FOR MONITORING

(71) Applicant: INSTITUT FUR RUNDFUNKTECHNIK GMBH, Munich (DE)

(72) Inventors: Uwe Kruger, Fridingen (DE); Joachim Von Parpart, Cologne (DE)

(73) Assignee: INSTITUT FUR RUNDFUNKTECHNIK GMBH, Munich (DE)

( * ) Notice: Subject to any disclaimer, the term of this patent is extended or adjusted under 35 U.S.C. 154(b) by 0 days.

(21) Appl. No.: 14/615,858

(22) Filed: Feb. 6, 2015

(65) Prior Publication Data

US 2015/0256271 A1  Sep. 10, 2015

(30) Foreign Application Priority Data

Feb. 6, 2014  (IT) .............................. TO2014A0097

(51) Int. Cl.
*H04B 17/00*  (2015.01)
*H04B 17/10*  (2015.01)
(Continued)

(52) U.S. Cl.
CPC ............ *H04B 17/103* (2015.01); *H04B 17/12* (2015.01); *H04B 17/17* (2015.01); *H04B 17/18* (2015.01)

(58) Field of Classification Search
CPC ......... H01Q 1/243; H04B 17/11; H04B 17/21; H04W 24/08; G01R 27/06; G08B 13/2471
(Continued)

(56) References Cited

U.S. PATENT DOCUMENTS 6,002,561 A    12/1999  Dougherty
7,391,332 B2 *  6/2008  Wakisaka ................. H04B 3/30
                                                     340/561

(Continued)

OTHER PUBLICATIONS

Goran Stancic et al., *Design of Digital Recursive Notch Filter with Linear Phase Characteristic*, 2013 11th International Conference on Telecommunications in Modern Satellite, Cable, and Broadcasting Services, IEEE, vol. 1, Oct. 16, 2013, pp. 69-72.
(Continued)

*Primary Examiner* — Sonny Trinh
(74) *Attorney, Agent, or Firm* — Workman Nydegger

(57) ABSTRACT

An arrangement (102, 100) for monitoring the operation of a transmitter antenna system (112). The transmitter antenna system is adapted for the emission of one or more information signals (M1.1 , M2.1 , M3.1 , M4.1). The arrangement for monitoring is provided with a retrieval arrangement (102) for retrieving a first detection signal which is a measure for the reflection signal in the transmitter antenna system. According to the invention, the arrangement for monitoring is further provided with a detection arrangement (100) which is adapted to establish whether, in the frequency characteristic of the first detection signal, frequency components that are different from the one or more information signals (M1.1 , M2.1 , M3.1 , M4.1) are present in the first detection signal and to generate a second detection signal if this is the case. This way, the occurrence of an arc in a transmitter antenna system can be reliably established.

23 Claims, 5 Drawing Sheets

(51) Int. Cl.
*H04B 17/17* (2015.01)
*H04B 17/18* (2015.01)
*H04B 17/12* (2015.01)

(58) Field of Classification Search
USPC .......................... 455/67.11, 115.1, 117, 129
See application file for complete search history.

(56) References Cited

U.S. PATENT DOCUMENTS

| | | | |
|---|---|---|---|
| 8,410,786 B1 | 4/2013 | Bradley | |
| 2005/0124304 A1* | 6/2005 | Bendov | H01Q 1/002 455/115.1 |
| 2006/0246849 A1* | 11/2006 | Tran | H01Q 9/145 455/77 |
| 2006/0252390 A1* | 11/2006 | Bendov | H01Q 1/002 455/117 |
| 2011/0053632 A1* | 3/2011 | Liu | H04B 17/102 455/522 |

OTHER PUBLICATIONS

Italian Search Report issued Jun. 5, 2014, in Italian Application No. TO2014A000097, filed Feb. 6, 2014.

\* cited by examiner

ARRANGEMENT FOR MONITORING THE OPERATION OF A TRANSMITTER ANTENNA SYSTEM, METHOD FOR MONITORING, AND A DETECTION ARRANGEMENT THAT CAN BE USED IN THE ARRANGEMENT FOR MONITORING

CROSS-REFERENCE TO RELATED APPLICATIONS

This application claims priority to Italian Application No. TO2014A000097, filed Feb. 6, 2014, which is incorporated herein by specific reference.

BACKGROUND OF THE INVENTION

The invention relates to an arrangement for monitoring the operation of a transmitter antenna system, which is adapted to transmit one or more information signals, which arrangement is provided with a retrieval arrangement (102) for retrieving a first detection signal, which first detection signal is a measure of a reflection signal in the transmitter antenna system.

The invention also relates to a detection arrangement that can be used in the arrangement for monitoring and to a method of monitoring the operation of a transmitter antenna system.

An arrangement for monitoring, as introduced above, is known for example in the form of the TS4506 HF performance security system of the company Rohde & Schwarz. This arrangement realizes a performance measurement of the transmission signal to determine whether overload, wear or mismatch occurs.

SUMMARY OF THE INVENTION

It is an object of the invention to propose an improved arrangement for monitoring. In order to achieve this, the known arrangement is accordingly further characterized by the features of claim 1. Further embodiments of the arrangement according to the invention are characterized by the claims 2 to 9. The detection arrangement of the invention is characterized according to the claims 10 to 18. The method for monitoring is characterized according to the claims 19 and 20.

The invention is based on the following inventive ideas.

After a fire on Jul. 15, 2011, a guyed transmitter tower of Smilde, in the north of The Netherlands, broke in the middle and collapsed. Due to the collapse, the bottom reinforced concrete tower had been damaged as well. All public and commercial broadcasting and TV programs emitted from said transmitter tower failed, of which a large part of the north of The Netherlands was affected. Therefore, on Aug. 4, 2011, an abandoned medium wave transmitter was hired to be able to provide the affected regions with the radio program. On Oct. 31, 2011, the rebuilding of the transmitter was started. The rebuilding was finished by mid May 2012. In August 2012 start of operation had begun.

This fire was not an isolated incident. Meanwhile, similar events had occurred at multiple transmitter stations in different countries.

A fire thus implies many problems. Replacement transmitters were needed to be found and adjusted such that they could take over the broadcasting of the radio programs and television programs during the rebuilding of the transmitter tower. The costs for the rebuilding are very high.

A fire can easily develop in a transmitter antenna system when an arc occurs. When components of a transmitter antenna system are subject to mechanical damage or connectors comprise an unallowable contact resistance due to for example ageing, heat damage can occur at these positions possibly due to for example large performance load, which can possibly lead to a fire. Therefore, the need of a measurement based determination of this situation developed, such that the transmitter could be decoupled to prevent a possible spreading of the damage.

By the provisions of the invention an arrangement for monitoring is proposed, which is capable of reliably detecting the formation of an arc. This is achieved by the establishment whether, in the frequency characteristic of the first detection signal, frequency components that differ from the one or more information signals are present, and by the generation of a second detection signal if this is the case. These frequency components that differ from the one or more information signals in the first detection signal are namely an indication for the occurrence of an arc and can be reliably detected.

In the following, the invention is further explained by means of several exemplary embodiments.

BRIEF DESCRIPTION OF THE FIGURES

It shows.

DETAILED DESCRIPTION OF THE FIGURES

Figure 1:
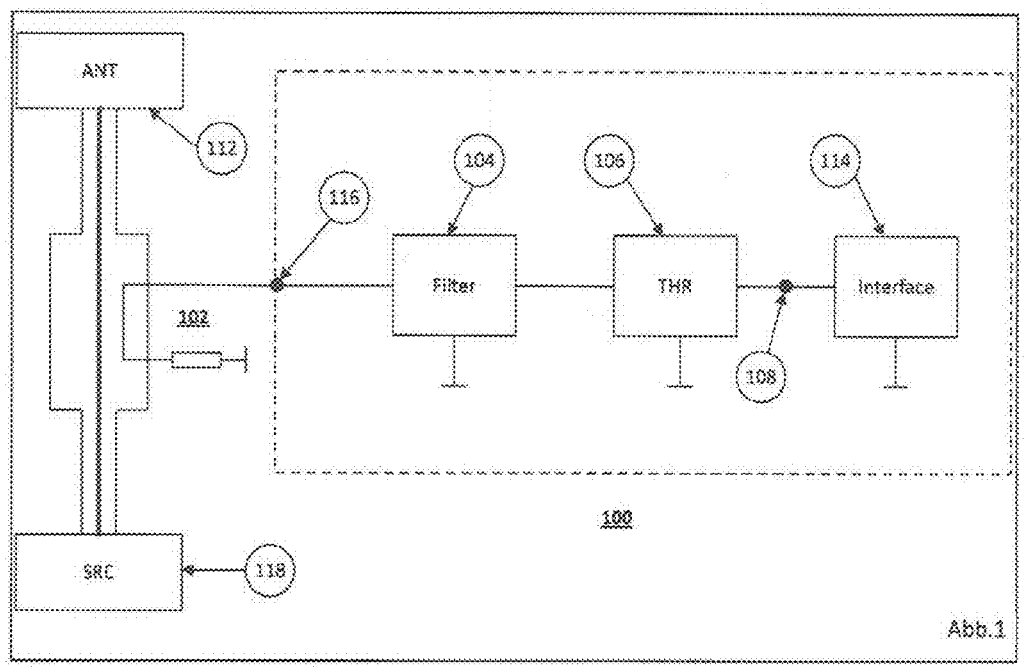
FIG. 1 a first exemplary embodiment of the arrangement for monitoring.

FIG. 1 shows a first exemplary embodiment of an arrangement for monitoring the operation of a transmitter antenna system 112. The transmitter antenna system 112 comprising antennas, couplers, distributors and the supply cable, is schematically depicted as a transmitter antenna ANT which is supplied with a radio and/or television signal by a radio and/or television program source (SRC) 118. The transmission amplifier (not shown) is generally housed within the source 118. The supply cable is generally formed as a coaxial cable.

The arrangement for monitoring is provided with a retrieval arrangement 102 and a detection arrangement 100. The retrieval arrangement 102 is adapted to generate a first detection signal which is a measure of the reflection signal of the antenna system 112. The retrieval arrangement 102 provides the first detection signal to the input terminal 116.

Due to the supply of the radio and/or television signal a so-called leading signal develops from the source 118 to the transmitter antenna system 112. The leading wave is reflected in an attenuated fashion upon arrival at the transmitter antenna system and a reflection signal (or return wave) develops. The leading wave, set out as a function of the frequency principally comprises a maximum at a carrier frequency of the radio and/or television signal, which lies in USW FM at around 98 MHz. Due to the arc in the transmitter antenna system, frequency components additionally develop in the reflection signal, as will be further explained later on.

Figure 5:
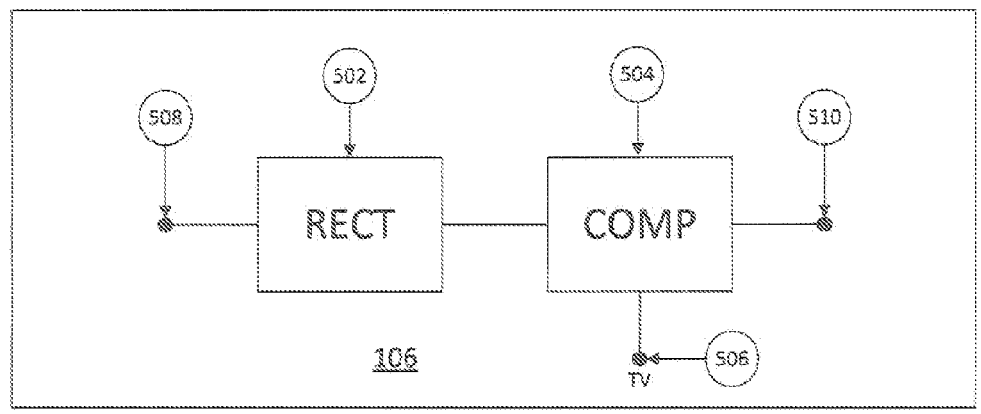
FIG. 5 an exemplary embodiment of the threshold arrangement.

The detection arrangement 100 is provided with a filter arrangement 104 which is configured to filter the first detection signal, and a threshold arrangement (THR) 106 for comparing the filtered first detection signal of the filter arrangement 104 with a threshold value to generate a second detection signal which is supplied to the signal terminal 108. As indicated in FIG. 5, the filtered first detection signal is therefore preferably rectified first in a rectifier arrangement 502 in the threshold arrangement 106 and this rectified signal is compared within a comparator arrangement 504 with a threshold TV, which is connected to a terminal 506 of the rectifier arrangement.

In particular, a second detection signal is generated at the signal terminal 108, when the filtered and rectified first detection signal exceeds this threshold. The second detection signal at the terminal 108 then passes to an interface 114 which generates, when receiving the second detection signal, an acoustic or optic warning signal which can be heard or seen by a monitoring person. As will be explained later on, this warning signal is an indication that an arc has occurred in the transmitter antenna system. Hence, the monitoring person can take measures upon the occurrence of a warning signal, such as for example shutting down the transmission amplifier, thereby preventing a spreading of the damage. Otherwise, the signal terminal 108 connected to the interface 114 is adapted to automatically decouple the transmission amplifier or automatically switches over to another antenna arrangement, upon receipt of the second detection signal, as further explained later on.

Figure 2:
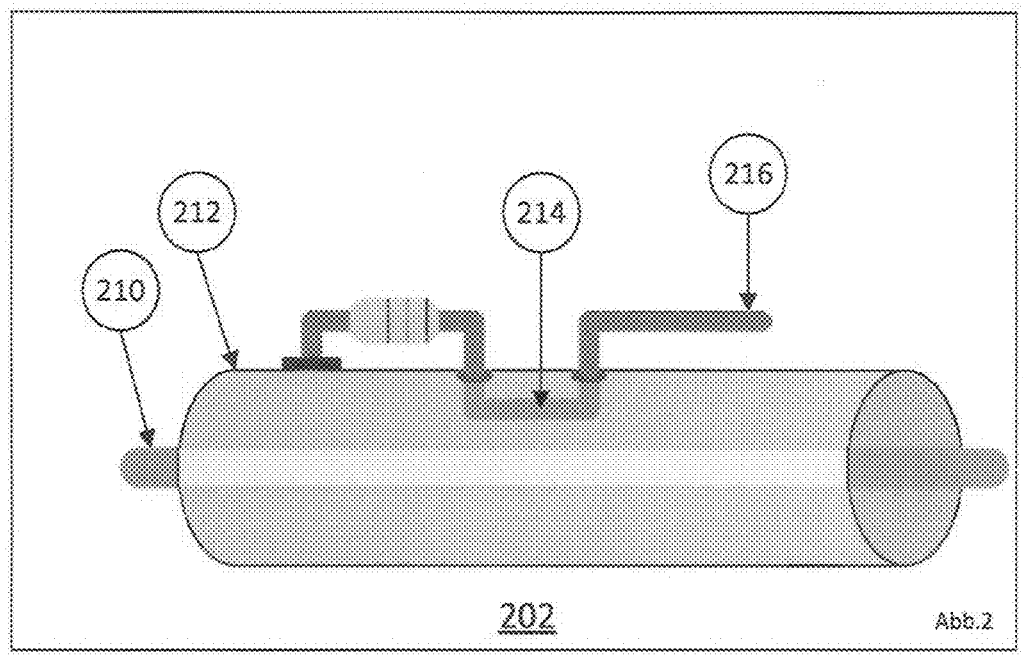
FIG. 2 an exemplary embodiment of a retrieval arrangement.

The retrieval arrangement 102 is further explained by means of FIG. 2 and indicated with reference numeral 202. Such retrieval arrangements are commercially available such as for example Spinner BN 800826 Ser. No. E39085.

As already introduced above, the retrieval arrangement is inserted at the start of the transmitter antenna system, wherein in FIG. 2 the source 118 is located at the left side of the retrieval arrangement 202 and the transmitter antenna system 112 is located at the right side of the retrieval arrangement 202. In general, as shown in FIG. 2, the connection cable is formed as a coaxial cable with a signal conductor 210 in a conductor sheath 212 which serves as a signal ground. The retrieval arrangement 202 is interposed within this coaxial cable. Due to the inductive and capacitive coupling between the signal conductor 210 and the conductor part 214 of the retrieval arrangement 202, the first detection signal develops at the signal terminal 216.

Figure 3:
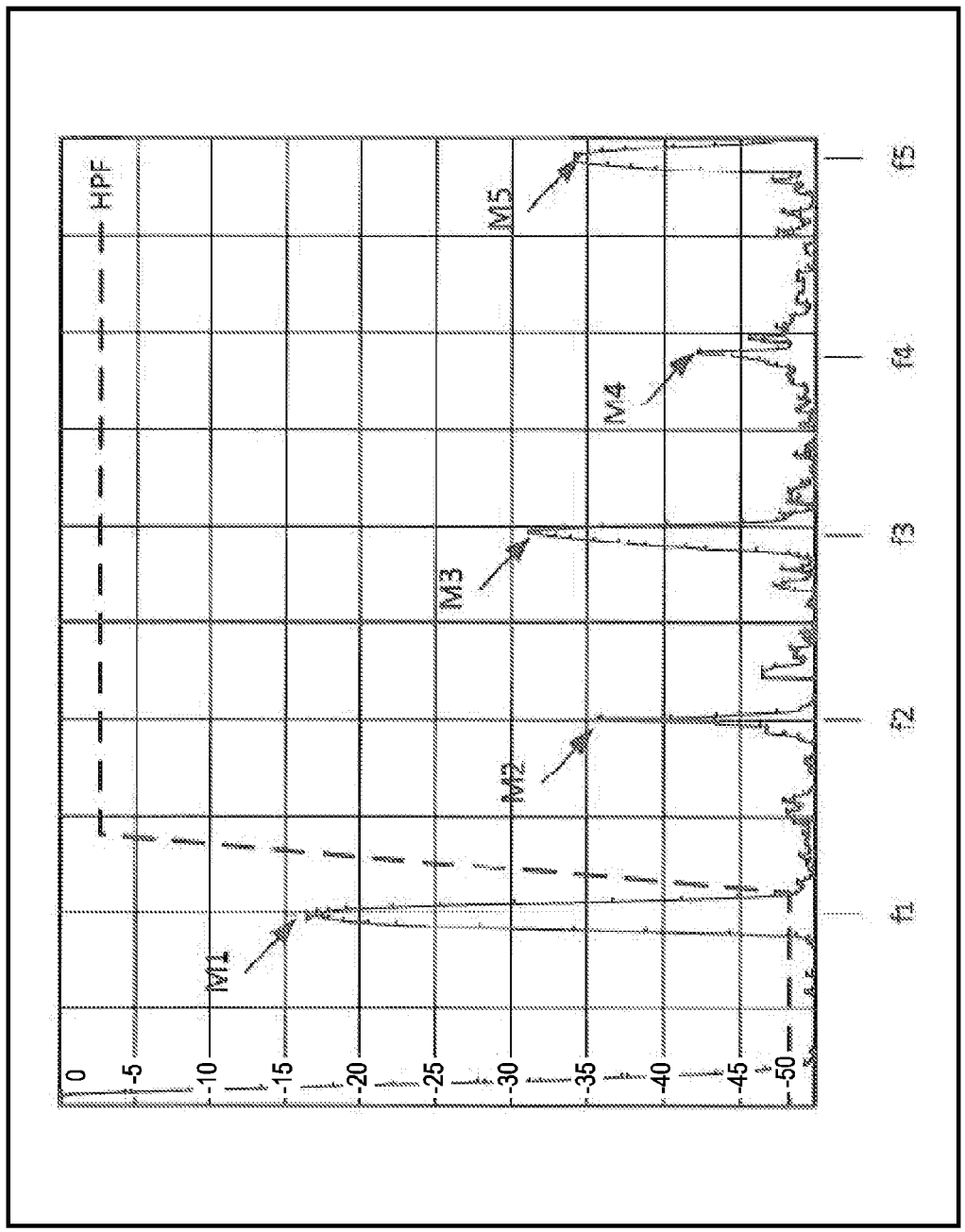
FIG. 3 the graph of a first detection signal as a function of the frequency.

The first detection signal, which is a measure for the reflection signal of the transmitter antenna system 112, is schematically shown in FIG. 3, also during occurrence of an arc.

FIG. 3 shows the amplitude of the first detection signal as a function of the frequency. Here, it is assumed that only one information signal is emitted from the transmitter antenna system. For the normal functioning of the transmitter antenna system the frequency characteristic of the first detection signal essentially shows only one maximum M1 (fundamental oscillation) for the frequency of the carrier frequency of the information signal of the signal source 118, which is to be send. This is also known as fundamental frequency. This frequency lies for example for USW FM transmission systems at around 98 MHz.

During the occurrence of an arc, FIG. 3 shows that additional relative maxima (overtones or higher harmonics) M2, M3, M4 occur at other frequencies, in general higher frequencies.

In this exemplary embodiment of the detection arrangement 100 the first detection signal is highpass filtered to be able to detect the overtones in order to reliably determine the occurrence of an arc. This highpass filtering is indicated in FIG. 3 with the dashed frequency characteristic curve HPF. The cut-off frequency of the frequency characteristic curve HPF is above the fundamental frequency f1, such that the fundamental frequency component is filtered out in the first detection signal. The cut-off frequency of the frequency characteristic curve HPF is below the frequencies of the overtones f2, f3, f4, such that these fundamental frequency components are filtered out in the first detection signal for comparison with the threshold in the threshold arrangement (THR) 106.

Figure 4:
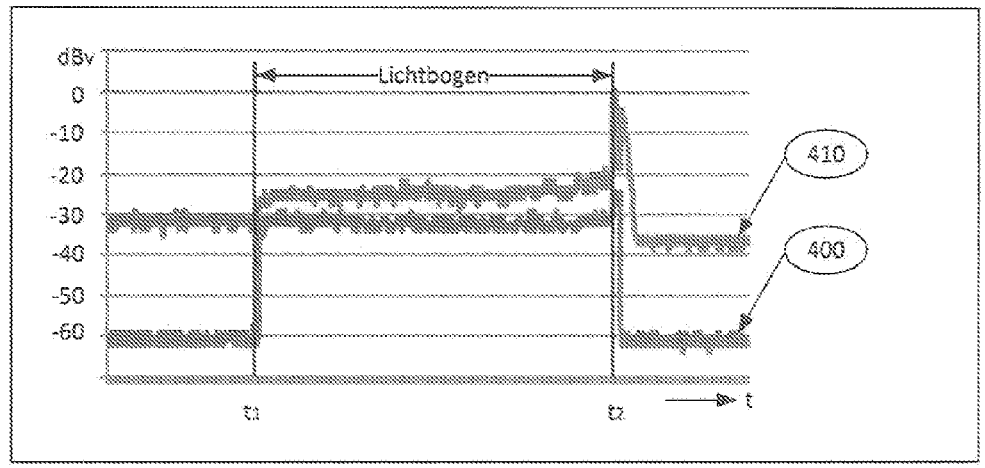
FIG. 4, the course of the voltage on a logarithmic scale of a highpass filtered and lowpass filtered first detection signal as a function of time during the formation of an arc.

However, generally it can be said that the detection arrangement is adapted to determine whether in the frequency characteristic of the first detection signal, frequency components that differ from the one or more information signals are present in the first detection signal, and to generate a second detection signal if this is the case. Various solutions for the realization of this task are possible, as shown in FIG. 4 by the highpass filtering. However, other solutions are also possible, as further explained later on.

The value of the threshold is obviously chosen such that the amplitude of the filtered and rectified first detection signal lies below the threshold in the absence of an arc, and the amplitude is larger than the threshold in the occurrence of an arc. If at some point a signal inversion is implemented, this can obviously also be the other way around.

The cut-off frequency can be arbitrarily chosen as long as the fundamental oscillation (or the fundamental oscillations in case multiple information signals are emitted) is (are) filtered out. With this, it is meant that if for example the overtone M2/f2 does not sufficiently add to the detection of an arc, the cut-off frequency can lie higher, for example between f2 and f3. Or, one could maybe filter out signal components below the fundamental frequency (fundamental frequencies) if this allows a reliable determination of an arc.

The filter arrangement 104 can be formed as a highpass filter arrangement, as indicated by the dashed curve HPF. The filter arrangement can also be formed in a different way, such that the same result is realized. The filter arrangement can also be formed as a notch filter, wherein the minimum in the notch filter characteristic lies at a frequency f1, such that the fundamental oscillation M1 (or the fundamental oscillations) can be suppressed, as further explained later on in FIG. 8.

It may be obvious for a person skilled in the art that if a highpass filter is used, the highpass filter HPF can hence release again as long as by all means the most important overtones are detected correctly.

In FIG. 4 two signals are depicted logarithmically as a function of time. The lower curve 400 shows the level of the highpass filtered first detection signal as it is available at the output of the filter arrangement 104. The upper curve 410 shows the level of the first detection signal that is lowpass filtered with a lowpass filter with a cut-off frequency between f1 and f2, see FIG. 3. This means that the signal 410 comprises only the fundamental oscillation. The levels have been set out logarithmically on the vertical axis. Each step across the vertical axis corresponds to 10 dB.

If no arc is present, that is, for times shorter than t1 in FIG. 4, the value of the highpass filtered first detection signal (the curve 400) lies approximately far below the level of the reflected fundamental oscillation (the curve 410) at the antenna system. When an arc occurs, at t1, the level of the highpass filtered first detection signal (curve 400) steeply increases, for example with 30 dB, as indicated in the figure. The level of the fundamental oscillation (the curve 410) basically remains unchanged. Hence, due to the voltage course, which is depicted by the curve 400, a reliable and unambiguous detection of the occurrence of an arc is possible.

FIG. 5 shows an exemplary embodiment of the threshold arrangement 106. The threshold arrangement 106 in FIG. 5 is provided with a rectifier arrangement 502 for rectifying the first detection signal that is provided at the input 508. Furthermore, a comparator arrangement 504 is provided for comparing the rectified first detection signal with a threshold TV, which is provided at a terminal 506 of the comparator arrangement 504. Based on the comparison with the threshold TV, the comparator arrangement 504 generates the second detection signal, which is provided at an output 510.

Figure 6:
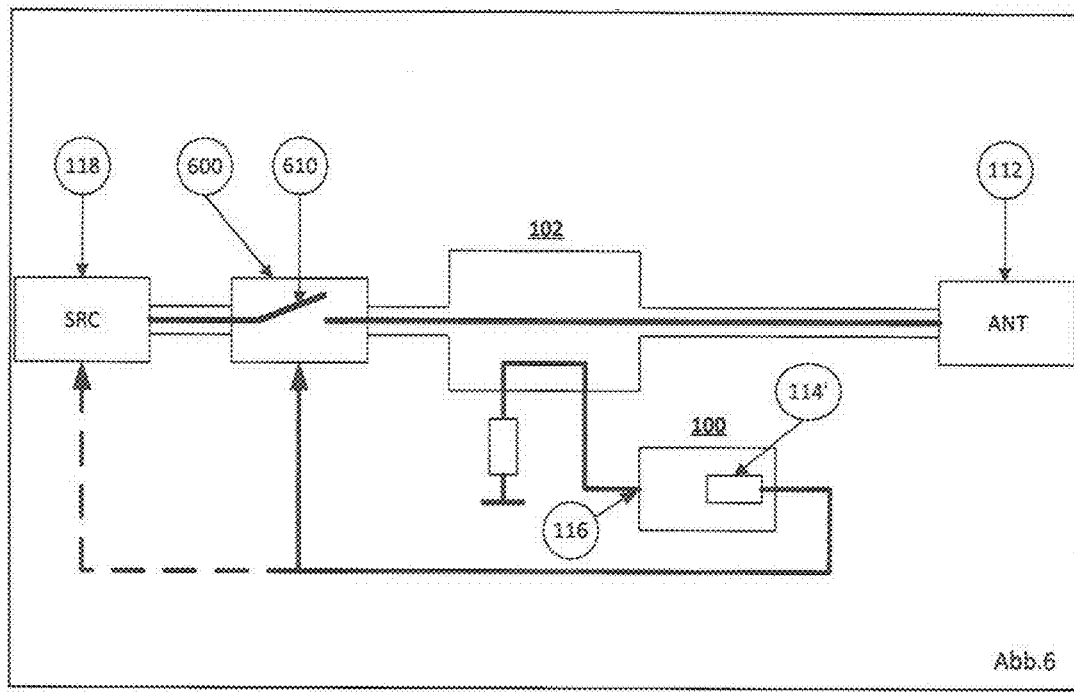
FIG. 6 the decoupling of a transmission source, when an arc is detected.

FIG. 6 shows how the signal source is switched off after a detection of an arc. For this purpose, a switching-off arrangement 600 for decoupling the source 118 is provided in the connection cable between the source 118 and the transmitter antenna system 112. The interface 114' generates a control signal to control the switching-off arrangement 600, such that the switch 610 in the switching-off arrangement 600 is directed into the shown position. Hence, the source is decoupled from the transmitter antenna system 112. It is also possible that the interface 114' directly intervenes at the source to stop the power flow.

Figure 7:
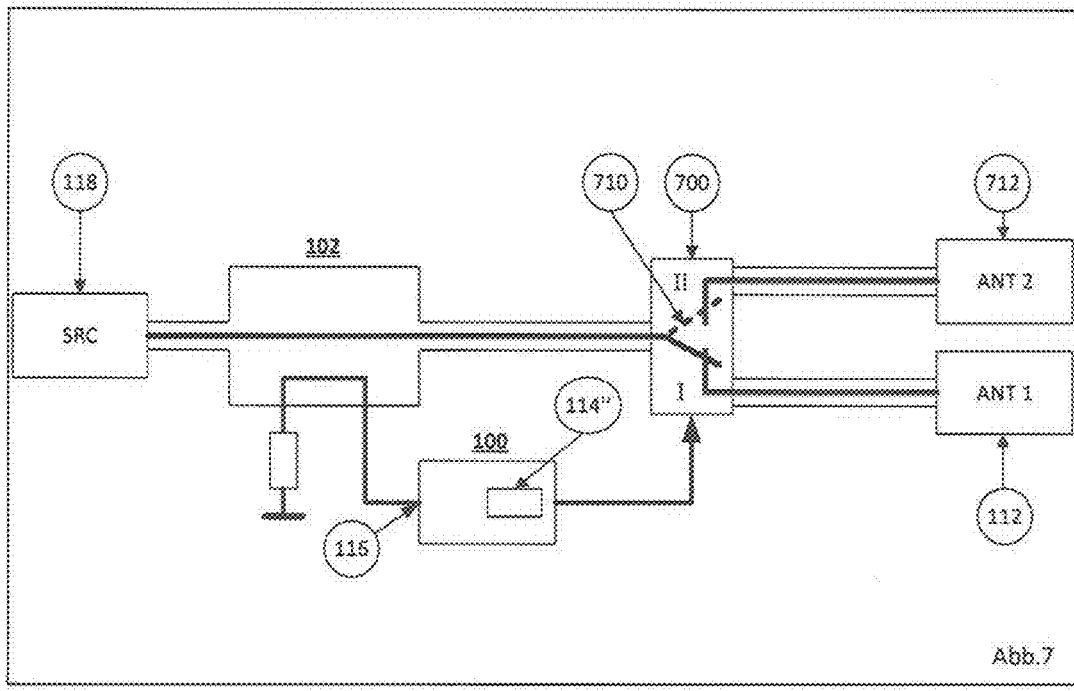
FIG. 7 the switching over to another antenna arrangement, when an arc is detected.

FIG. 7 shows how the signal source is switched over to another transmitter antenna system 712 after detection of an arc. For this purpose, a switching-over arrangement 700 for switching over the source 118 to the transmitter antenna system 712 is provided in the connection cable between the retrieval arrangement 102 and the transmitter antenna system 112. The evaluation circuit 114" generates, after detection of an arc, a control signal for controlling the switching-over arrangement 700, such that the switch 710 in the switching-over arrangement 700 is switched from position I into position II. The source 118 is hence switched over from the transmitter antenna system 112 to the transmitter antenna system 712, such that the broadcasting can be continued.

Figure 8:
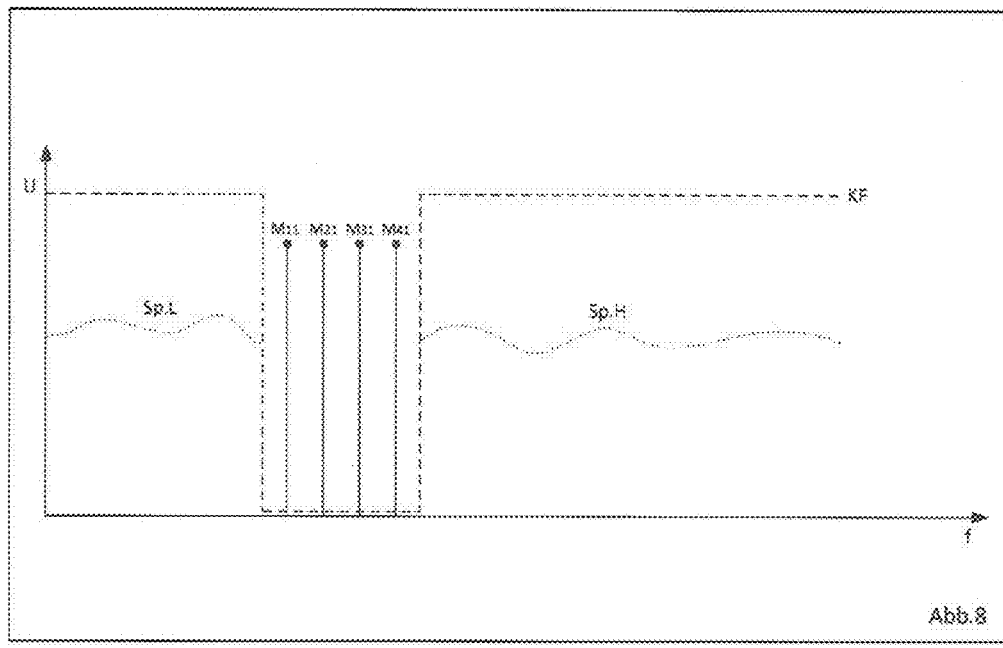
FIG. 8 schematic view of a first detection signal in the case when multiple information signals are present.

FIG. 8 schematically shows a first detection signal in the case when more information signals, for example four information signals, are present. The carrier frequencies (fundamental frequencies) of the reflected information signals are indicated by the maxima M1.1, M2.1, M3.1, and M4.1, that lie again around 98 Mhz in this example. FIG. 8 shows additional relative maxima (Sp.L and Sp.H) during the occurrence of an arc. If for example a notch filter is inserted here, the detection arrangement can recognize and detect the additionally occurring relative maxima independently from the fundamental oscillations.

Figure 9:
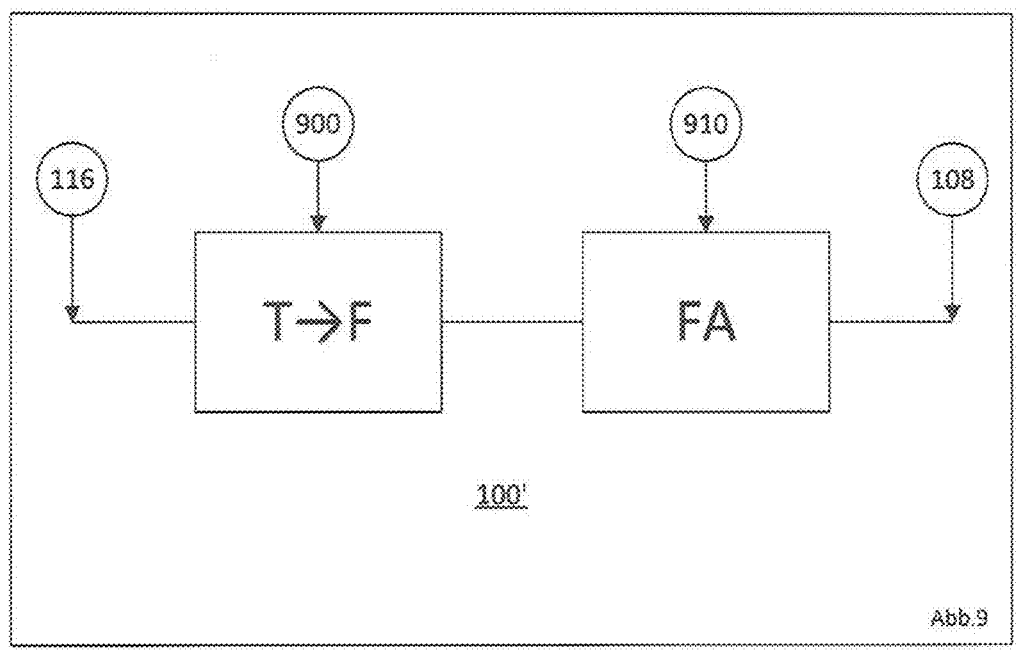
FIG. 9 a schematic view of the detection via a frequency analysis.

FIG. 9 shows another exemplary embodiment of the detection arrangement 100, which is indicated here with the reference number 100'. The detection arrangement 100' is provided with a converter unit 900 for converting the first detection signal provided at the input terminal 116 from the time domain into the frequency domain and is provided with a frequency analysis arrangement 910 to establish whether in the frequency domain converted first detection signal, frequency components which are different from the frequency components of the one or more information signals are present, and whether these exceed a predetermined value, and to generate the second detection signal at the output terminal 108 if this is the case.

The arrangement 100' can be formed as a spectrum analyzer, wherein changes in the spectral composition of the first detection signal are evaluated.

Hence, it is mentioned that the arrangement for monitoring, as described above, can be formed both as an analogue as well as a digital switch. Furthermore, the signal processing, as described above, can obviously also be formed in software. Furthermore, nowadays it is not a problem to evaluate the detection signal by means of a spectrum analyzer.

The invention claimed is:

1. An arrangement for monitoring the operation of a transmitter antenna system which is adapted to transmit one or more information signals, which arrangement is provided with a retrieval arrangement for retrieving a first detection signal, which first detection signal is a measure of a reflection signal in the transmitter antenna system, wherein the arrangement for monitoring is further provided with a detection arrangement, which detection arrangement is adapted to establish whether, in the frequency characteristic of the first detection signal, frequency components are present which are different from the frequency components of the one or more information signals, and to generate a second detection signal when frequency components are present which are different from the frequency components of the one or more information signals.

2. The arrangement for monitoring as claimed in claim 1, wherein the detection arrangement is provided with a filter arrangement to filter the first detection signal, and a threshold arrangement for comparing the filtered first detection signal with a threshold value (TV) to generate the second detection signal at an output.

3. The arrangement for monitoring as claimed in claim 2, wherein the threshold arrangement is adapted to generate the second detection signal in case the filtered first detection signal exceeds the threshold value.

4. The arrangement for monitoring as claimed in claim 2, wherein the filter arrangement is provided with a highpass filter (HPF) having a cut-off frequency which lies above the frequencies of the one or more information signals in the first detection signal.

5. The arrangement for monitoring as claimed in claim 2, wherein the filter arrangement comprises one or more notch filters (KF) having a notch frequency which is in the frequency area of the one or more information signals.

6. The arrangement for monitoring as claimed in claim 2, wherein the threshold arrangement is provided with a rectifier arrangement for rectifying the filtered first detection signal, and a comparator arrangement for comparing the rectified filtered first detection signal with the threshold value to generate the second detection signal.

7. The arrangement for monitoring as claimed in claim 1, wherein the detection arrangement is further provided with a switching-off arrangement, and the switching-off arrangement is adapted to decouple an information source which is coupled to the transmission antenna system, from that transmission antenna system, in response to the second detection signal.

8. The arrangement for monitoring as claimed in claim 1, wherein the detection arrangement is further provided with a switching-over arrangement, and the switching-over arrangement is adapted to switch the information source, which is coupled to the transmission antenna arrangement, over to another transmission antenna system in response to the second detection signal.

9. The arrangement for monitoring as claimed in claim 1, wherein the detection arrangement is provided with a converter unit for converting the first detection signal from the time domain into the frequency domain, and is provided with a frequency analysis arrangement, the frequency detection arrangement being adapted to establish whether frequency components in the frequency converted first detection signal which are different from the frequency components of the one or more information signals, exceed a predetermined value, and to generate the second detection signal if this is the case.

10. A detection arrangement that can be used in an arrangement for monitoring as claimed in claim 1, wherein the detection arrangement is provided with an input terminal for receiving a first detection signal of the retrieval arrangement in the arrangement for monitoring, and is adapted to establish whether, in the frequency characteristic of the first detection signal, frequency components are present which are different from the frequency components of the one or more information signals, and to generate a second detection signal when frequency components are present which are different from the frequency components of the one or more information signals.

11. The detection arrangement as claimed in claim 10, wherein it is provided with a filter arrangement for filtering the first detection signal and a threshold arrangement for comparing the filtered first detection signal with a threshold value (TV) for generating the second detection signal at an output.

12. The detection arrangement as claimed in claim 11, wherein the threshold arrangement is adapted to generate the second detection signal in case the filtered first detection signal exceeds the said threshold value.

13. The detection arrangement as claimed in claim 11, wherein the filter arrangement is provided with a highpass filter (HPF) having a cut-off frequency which lies above the frequencies (fl) of the one or more information signals in the first detection signal.

14. The detection arrangement as claimed in claim 11, wherein the filter arrangement is provided with one or more notch filters (KF) having a notch frequency which lies in the frequency area of the one or more information signals.

15. The detection arrangement as claimed in claim 11, wherein the threshold arrangement is adapted with a rectifier arrangement for rectifying the filtered first detection signal and a comparator arrangement for comparing the rectified filtered first detection signal to the threshold value (TV), for generating said second detection signal.

16. The detection arrangement as claimed in claim 10, wherein the detection arrangement is further provided with a switching-off arrangement, and the switching-off arrangement is adapted to decouple an information source which is coupled to the transmission antenna system, from that transmission antenna system, in response to the second detection signal.

17. The detection arrangement as claimed in claim 10, wherein the detection arrangement is further provided with a switching-over arrangement, and the switching-over arrangement is adapted to switch the information source, which is coupled to the transmission antenna arrangement, over to another transmission antenna system in response to the second detection signal.

18. The detection arrangement as claimed in claim 10, wherein the detection arrangement is provided with a converter unit for converting the first detection signal from the time domain into the frequency domain, and is provided with a frequency analysis arrangement, the frequency analysis arrangement being adapted to establish whether frequency components in the frequency converted first detection signal which are different from the frequency components of the one or more information signals exceed a predetermined value, and to generate the second detection signal if this is the case.

19. A method of monitoring the operation of a transmission antenna system, which transmits one or more information signals, in which a reflection signal is retrieved from the transmission antenna system and a first detection signal is generated which is a measure of said reflection signal, wherein it is established whether, in the frequency characteristic of the first detection signal, frequency components are present which are different from the frequency components of the one or more information signals, and when frequency components are present which are different from the frequency components of the one or more information signals, a second detection signal is generated.

20. An arrangement for establishing the occurrence of an arc in a transmitter antenna system during transmission of one or more information signals by the transmitter antenna system, which arrangement is provided with a retrieval arrangement for retrieving a first detection signal, which first detection signal is a measure of a reflection signal in the transmitter antenna system, wherein the arrangement for monitoring is further provided with a detection arrangement, which detection arrangement is adapted to establish whether, in the frequency characteristic of the first detection signal, frequency components are present which are different from the frequency components of the one or more information signals, and to generate a second detection signal when said frequency components are present which are different from the frequency components of the one or more information signals.

21. The arrangement as claimed in claim 20, wherein the retrieval arrangement is in the form of a direction coupler.

22. The arrangement as claimed in claim 21, wherein the switching arrangement is further adapted to switch-over the signal source coupled to the transmission antenna system to another transmission antenna system, in response to the second detection signal.

23. The arrangement as claimed in claim 20, wherein the detection arrangement is further provided with a switching arrangement, the switching arrangement being adapted to switch-off a signal source coupled to the transmitter antenna system, in response to the second detection signal.

* * * * *